United States Patent
Chang et al.

(10) Patent No.: US 9,549,114 B2
(45) Date of Patent: Jan. 17, 2017

(54) FOCUS IDENTIFICATION METHOD, SYSTEM, AND COMPUTING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Jia-Jia Chen, Shenzhen (CN); Zhong-Kui Yuan, Shenzhen (CN); Li Jiang, Shenzhen (CN); Dong-Hai Li, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 314 days.

(21) Appl. No.: 14/250,975

(22) Filed: Apr. 11, 2014

(65) Prior Publication Data
US 2014/0313323 A1    Oct. 23, 2014

(30) Foreign Application Priority Data
Apr. 23, 2013    (CN) .......................... 2013 1 01418388

(51) Int. Cl.
*H04N 5/232*    (2006.01)
*G06T 7/00*    (2006.01)

(52) U.S. Cl.
CPC .......... *H04N 5/23212* (2013.01); *G06T 7/0002* (2013.01); *G06T 2207/10016* (2013.01); *G06T 2207/30121* (2013.01)

(58) Field of Classification Search
CPC ................. G06T 7/0002; G06T 2207/10016; G06T 2207/30121; H04N 5/23212
See application file for complete search history.

(56) References Cited

U.S. PATENT DOCUMENTS

| | | | | |
|---|---|---|---|---|
| 2004/0263672 | A1* | 12/2004 | Yoshida | G02B 7/38 348/345 |
| 2006/0078323 | A1* | 4/2006 | Nakahara | G03B 13/36 396/127 |
| 2007/0263997 | A1* | 11/2007 | Hirai | G03B 13/36 396/123 |
| 2010/0158496 | A1* | 6/2010 | Chang | H04N 5/23212 396/125 |

* cited by examiner

*Primary Examiner* — Behrooz Senfi
*Assistant Examiner* — Maria Vazquez Colon
(74) *Attorney, Agent, or Firm* — Zhingang Ma

(57) ABSTRACT

In a focus identification method for identifying different focuses of an object, discrete image data is acquired from captured images of an object. The images are captured by a charge coupled device (CCD) in motion of a measurement machine at a predetermined time period. The discrete image data includes definitions of the images and Z-coordinates of the CCD when capturing the images. Maxima and minima of the discrete image data are computed to establish intervals within the discrete image data. The intervals are selected one by one, and a curve is fitted according to the discrete image data at the selected interval. A peak value of the fitted curve is computed as one of focuses of the object when a goodness of fit of the fitted curve meets a predetermined criterion.

15 Claims, 4 Drawing Sheets

FOCUS IDENTIFICATION METHOD, SYSTEM, AND COMPUTING DEVICE

FIELD

Embodiments of the present disclosure relate to image measurement technique, and more specifically relate to a computing device, a method and a system for identifying focuses of an object having multiple layers.

BACKGROUND

Image measurement technique is widely used in precision measurement field for precisely, accurately, and speedily measuring an object using images of the object.

It may be understood that, a non-ideal focus may cause errors. Thus, it is important to identify different perspectives of an object to obtain precise measurements of the object.

Traditional focus identification methods fail to identify focuses of multiple layers of an object, such as a liquid crystal display.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
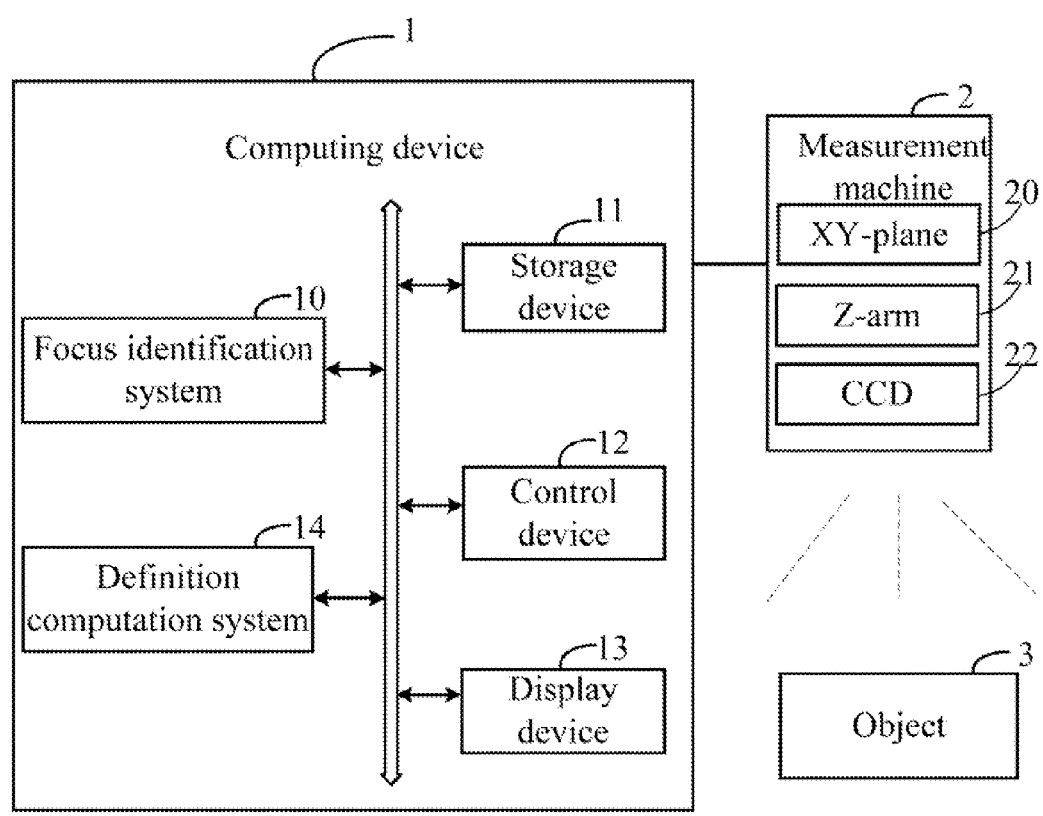
FIG. 1 is a block diagram of one embodiment of a computing device that executes a focus identification system.

FIG. 1 is a block diagram of one embodiment of a computing device 1 that executes a focus identification system 10. The computing device 1 may be a computer, a server, and so on. The computing device 1 further includes a storage device 11, a control device 12, a display device 13, and a definition computation system 14.

The computing device 1 can connect with a measurement machine 2 which has an XY-plane 20 and a Z-arm 21. An object 3 with multiple layers is to be measured, such as a liquid crystal display (LCD). The object 3 is placed on the XY-plane 20, and under the Z-arm 21. The Z-arm 21 is movable along a Z-axis of a coordinate system of the measurement machine 2, and a charge coupled device (CCD) 22 is installed at the end of the Z-arm 21. Thus, Z-coordinates of the CCD 22 can be adjusted to capture a plurality of images of the object 3 at different distances between the CCD 22 and the object 3.

The focus identification system 10 can include a plurality of function modules (shown in FIG. 2), to realize functions of identifying any particular focus of the measurement machine 2 to capture definite measured images of the object 3.

The storage device 11 can include some type(s) of non-transitory computer-readable storage medium, such as a hard disk drive, a compact disc, a digital video disc, or a tape drive. The storage device 11 stores the computerized codes of the function modules of the focus identification system 10.

The control device 12 can be a processor that may execute computerized codes of the function modules of the focus identification system 10 to realize the functions of the focus identification system 10.

The display device 13 can be a screen of the computing device 1, and displays visible data measured from the measurement machine 2.

The definition computation system 14 can compute definitions of the plurality of images of the object 3 captured by the CCD 22 at different distances between the CCD 22 and the object 3.

Figure 2:
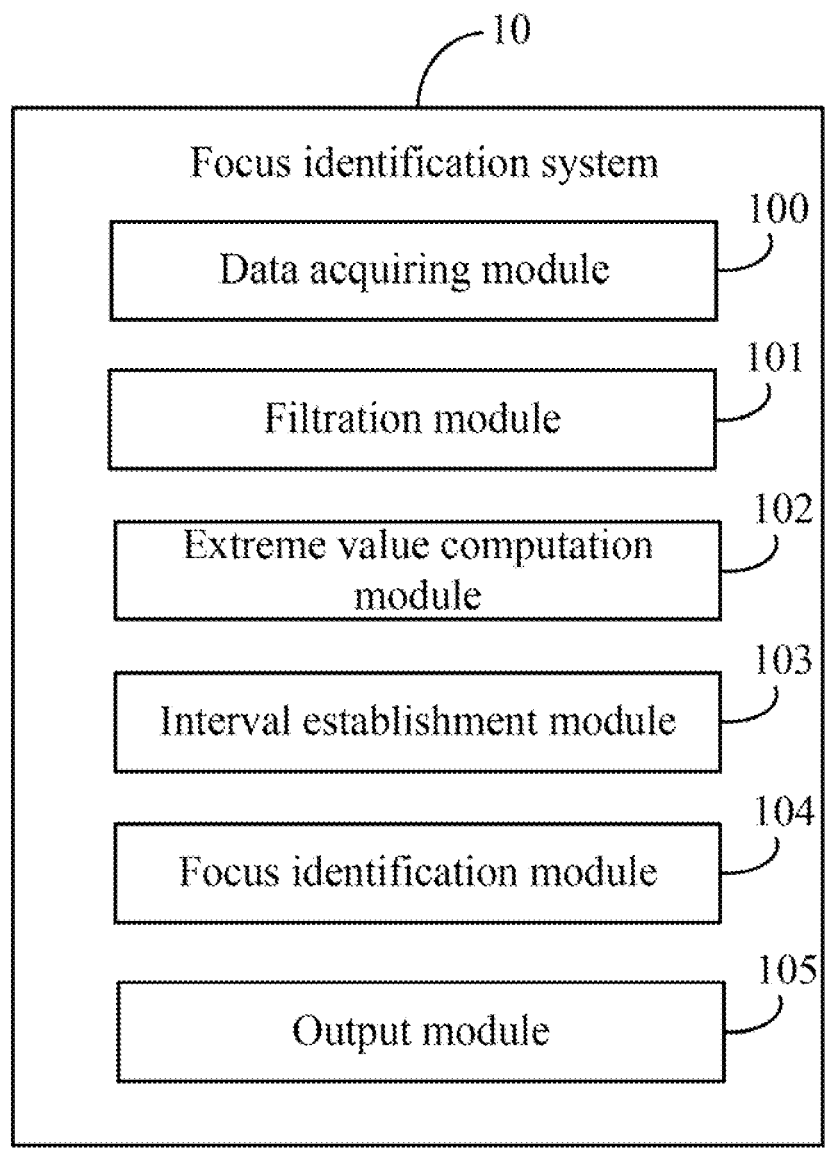
FIG. 2 is a block diagram of one embodiment of function modules of a focus identification system.

FIG. 2 is a block diagram of one embodiment of function modules of the focus identification system 10. The function modules includes a data acquiring module 100, a filtration module 101, an extreme value computation module 102, an interval establishment module 103, a focus identification module 104, and an output module 105. The function modules 100-105 can include computerized codes in the form of one or more programs, which provide at least the functions needed to execute the steps illustrated in FIG. 3.

Figure 3:
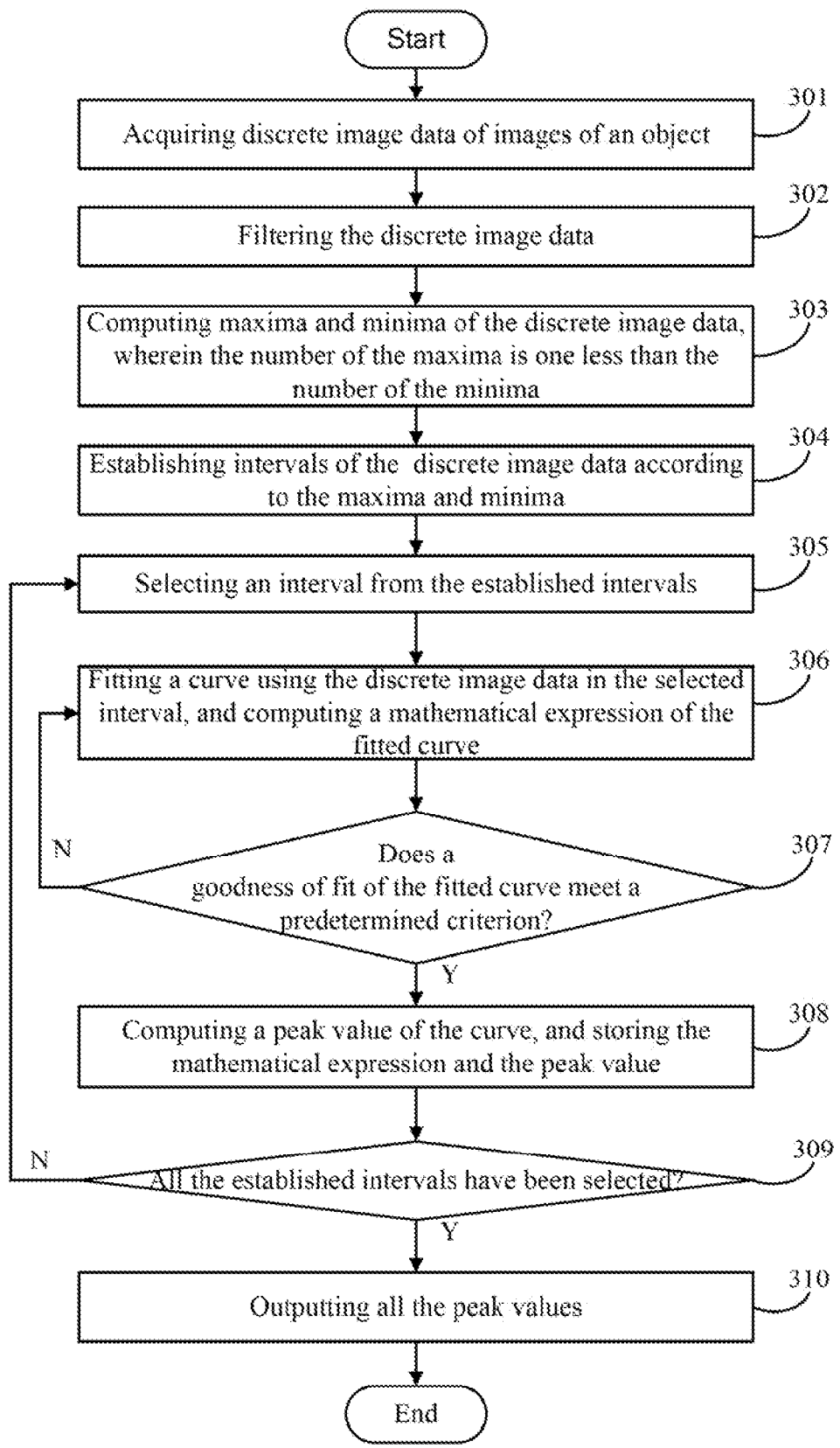
FIG. 3 illustrates a flowchart of one embodiment of a focus identification method.

FIG. 3 illustrates a flowchart of one embodiment of a focus identification method. The method is executed by at least one processor, for example, the control device 12, of the computing device 1. Depending on the embodiment, additional steps in FIG. 3 may be added, others removed, and the ordering of the steps may be changed.

In 301, the data acquiring module 100 acquires discrete image data from a plurality of images of the object 3. In at least one embodiment, the plurality of images of the object 3 are captured by the CCD 22 at a predetermined time period, such as two seconds, when the CCD 2 moves upwards or downwards along a Z-axis of the coordinate system of the measurement machine 2 at a fixed speed. The discrete image data includes definitions of the plurality of images and Z-coordinates of the CCD 22 when capturing the plurality of images.

In 302, the filtration module 101 filters the discrete image data. It may be understood that, when the CCD 22 moves upwards or downwards along the Z-axis of the coordinate system of the measurement machine 2 at a fixed speed, definitions of images captured by the CCD 22 periodically change regularly, in such a way as to be shown like a parabola. When a definition of one image moves up suddenly, the CCD 22 may be interrupted when capturing this image. The filtration module 101 filters such definitions and corresponding Z-coordinates. In at least one embodiment, the filtration module 101 filters the discrete image data using a Low-Pass Filter, such as a Savitzky-Golay Filter. The Savitzky-Golay filter is a digital filter that can be applied to a set of digital data points for the purpose of smoothing the data, that is, to increase the signal-to-noise ratio without greatly distorting the signal.

In 303, the extreme value computation module 102 computes maxima and minima of the discrete image data, wherein the number N of the maxima is one less than the number M of the minima, that is, N=M−1. In at least one embodiment, the extreme value computation module 102 computes maxima and minima of the discrete image data using a formula as follows:

$X=\{X[0],X[1], \ldots, X[n-1]\}$, wherein $X[0]$, $X[1], \ldots, X[n-1]$ are the discrete image data.

The first derivative of the above forum is:

$dX=diff(x)=\{X[1]-X[0], \ldots, X[n-1]-X[n-2]\}$; and

The second derivative of the above forum is:

$d_2X=diff(diff(x))=\{dX[1]-dX[0], \ldots, dX[n-2]-dX[n-3]\}$

The maxima of the discrete image data satisfy diff(sign(diff(X)))=−2, and the minima of the discrete image data satisfy diff(sign(diff(x)))=2, wherein sign(r) is a sign function which returns a value 1 when r>0, returns a value −1 when r<0, and returns a value 0 when r=0.

Figure 4:
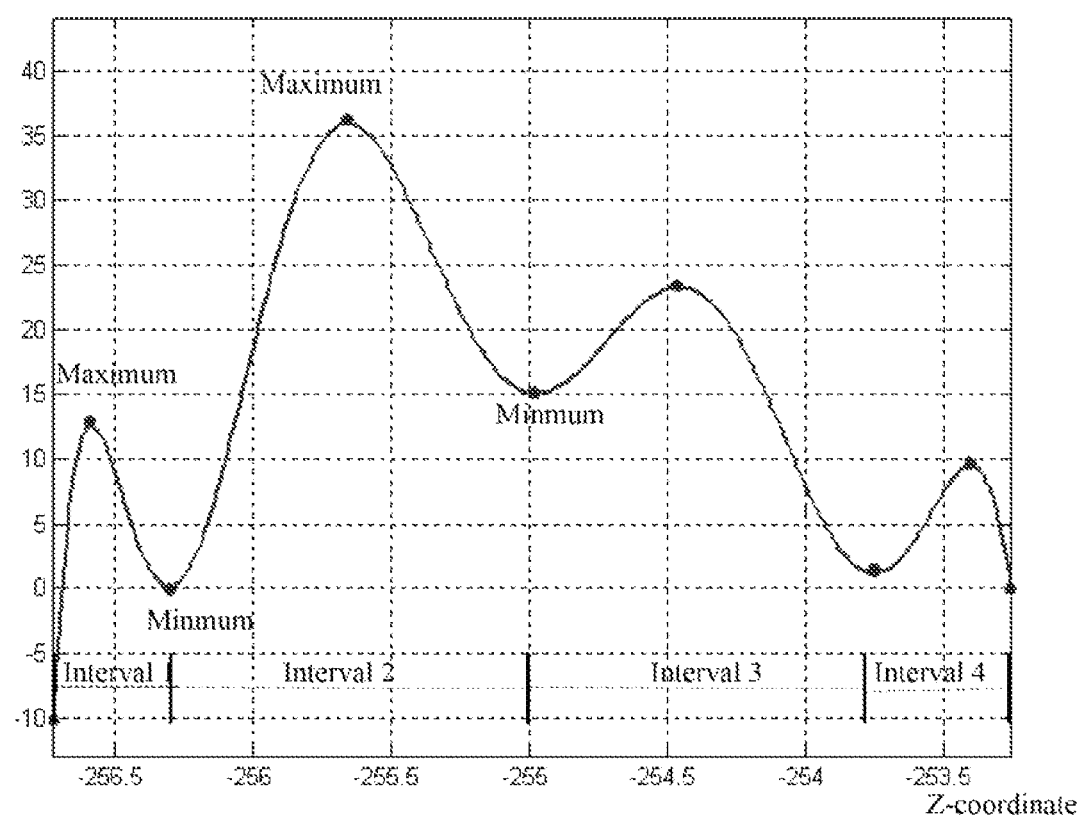
FIG. 4 shows an example of establishing intervals for the benefit of a method.

In 304, the interval establishment module 103 establishes intervals of the discrete image data according to the maxima and minima, as illustrated in FIG. 4. In at one embodiment, the discrete image data between two adjacent minima constitute an interval.

In 305, the focus identification module 104 selects an interval from the established intervals.

In 306, the focus identification module 104 fits a curve according to the discrete image data in the selected interval using a least square method, and computes a mathematical expression of the fitted curve. In at least one embodiment, for the discrete image data $(x_i, y_i)$, wherein $x_i$ is a definition, and $y_i$ is a Z-coordinate, the focus identification module 104 first establishes a Vandermonde matrix (V matrix) about $x_i$:

$$V = \begin{bmatrix} x_0 \wedge (n-1) & \ldots & x_0 \wedge k & \ldots & x_0 & 1 \\ x_1 \wedge (n-1) & \ldots & x_1 \wedge k & \ldots & x_1 & 1 \\ \vdots & \ldots & \vdots & \ldots & \vdots & \vdots \\ x_{n-1} \wedge (n-1) & \ldots & x_{n-1} \wedge k & \ldots & x_{n-1} & 1 \end{bmatrix},$$

wherein k=[0, 1, . . . , n−1].

Then, the focus identification module 104 obtains the following mathematical expression of the fitted curve based on the QR Decomposition and the Gaussian elimination method to the V matrix:

polyco=$V/y$;

$[Q,R]=qr(V)$;

polyco=$R/(Q^T*y)$;

wherein, polyco=[p1, p2, . . . , pn+1] are constant terms, V is the V matrix, Q and R are matrixes generated based on the QR Decomposition. $Q^T$ is a transposed matrix of the Q matrix.

In 307, the focus identification module 104 determines whether a goodness of fit of the fitted curve meets a predetermined criterion. In at least one embodiment, the focus identification module 104 the goodness of fit of the fitted curve can be determined using a Sum of Squares Due to Error (SSE) method or a R-square ($R^2$) method. The SSE method uses the follows formula:

$$WeightedSSE = \sum_{i=0}^{n-1} w_i(y_i - p(x_i))^2,$$

wherein $w_i$ is a weight, and can be determined by:

$$w_i = \left( \frac{\sum_{i=0}^{n-1} (y_i - \bar{y})^2}{n} \right)^{-1}.$$

When the SSE values approaches 0, the focus identification module 104 determines that a goodness of fit of the fitted curve meets the predetermined criterion.

The $R^2$ method uses the follows formula:

$$SSR = \sum_{i=0}^{n-1} (p(x_i) - \bar{y})^2,$$

$$SST = \sum_{i=0}^{n-1} w_i(y_i - \bar{y})^2,$$

$$R^2 = \frac{SSR}{SST} = 1 - \frac{SSE}{SST},$$

wherein SST=SSR+SSE, and when $R^2$ approaches 1, the focus identification module 104 determines that a goodness of fit of the fitted curve meets the predetermined criterion. When the goodness of fit of the fitted curve does not meet the predetermined criterion, 306 is implemented again. Otherwise, 308 is implemented when the goodness of fit of the fitted curve meets the predetermined criterion.

In 308, the focus identification module 104 obtains the mathematical expression of the fitted curve, computes a peak value of the fitted curve according to the mathematical expressions, and stores the mathematical expressions and the peak value into the storage device 11. The peak value is a focus of one of layers of the object 3.

In 309, the focus identification module 104 determines whether all the established intervals have been selected. When any of the established intervals has not been selected, 305 is implemented. Otherwise, 310 is implemented when all the established intervals have been selected.

In 310, the output module 105 outputs all the peak values, namely all the different focuses of the object 3, through the display device 13.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A focus identification method, the method being executed by at least one processor of a computing device, the method comprising:

acquiring discrete image data from a plurality of images of an object, wherein the plurality of images are captured by a charge coupled device (CCD) of a measurement machine every a predetermined time period when the CCD moves along a Z-axis of the measurement machine at a fixed speed, and the discrete image data comprises definitions of the plurality of images and Z-coordinates of the CCD when capturing the plurality of images;

computing maxima and minima of the discrete image data;

establishing intervals of the discrete image data according to the maxima and minima;

selecting an interval from the established intervals;

fitting a curve according to the discrete image data in the selected interval, and computing a mathematical expression of the fitted curve; and computing a peak value of the fitted curve as one of focuses of the object according to the mathematical expression, and storing the mathematical expression and the peak value into a storage device of the computing device upon condition that a goodness of fit of the fitted curve meets a predetermined criterion;

computing the maxima and the minima of the discrete image data by a formula as follows:

$X=\{X[0],X[1],\ldots,X[n-1]\}$, wherein $X[0]$, $X[1],\ldots,X[n-1]$ are the discrete image data;

The first derivative of the above forum is:

$dX=\text{diff}(x)=\{X[1]-X[0],\ldots,X[n-1]-X[n-2]\}$; and

The second derivative of the above forum is:

$d_2X=\text{diff}(\text{diff}(x))=\{dX[1]-dX[0],\ldots,dX[n-2]-dX[n-3]\}$;

The maxima of the discrete image data satisfy diff(sign(diff(X)))=−2, and the minima of the discrete image data satisfy diff(sign(diff(x)))=2 wherein sign(r) is a sign function which returns a value 1 when r>0, returns a value −1 when r<0, and returns a value 0 when r=0.

2. The method according to claim 1, wherein the object has multiple layers.

3. The method according to claim 2, wherein the object is a liquid crystal display (LCD).

4. The method according to claim 1, further comprising:

filtering the discrete image data before computing the maxima and minima.

5. The method according to claim 1, wherein the number of the maxima is one less than the number of the minima.

6. A computing device that executes a focus identification method, the computing device comprising:

a control device; and a storage device storing one or more programs which when executed by the control device, causes the control device to:

acquire discrete image data from a plurality of images of an object, wherein the plurality of images are captured by a charge coupled device (CCD) of a measurement machine every a predetermined time period when the CCD moves along a Z-axis of the measurement machine at a fixed speed, and the discrete image data comprises definitions of the plurality of images and Z-coordinates of the CCD when capturing the plurality of images;

compute maxima and minima of the discrete image data;

establish intervals of the discrete image data according to the maxima and minima;

select an interval from the established intervals;

fit a curve according to the discrete image data in the selected interval, and compute a mathematical expression of the fitted curve; and compute a peak value of the fitted curve as one of focuses of the object according to the mathematical expression, and store the mathematical expression and the peak value into the storage device upon condition that a goodness of fit of the fitted curve meets a predetermined criterion;

computing the maxima and the minima of the discrete image data by a formula as follows:

$X=\{X[0],X[1],\ldots,X[n-1]\}$, wherein $X[0]$, $X[1],\ldots,X[n-1]$ are the discrete image data;

The first derivative of the above forum is:

$dX=\text{diff}(x)=\{X[1]-X[0],\ldots,X[n-1]-X[n-2]\}$; and

The second derivative of the above forum is:

$d_2X=\text{diff}(\text{diff}(x))=\{dX[1]-dX[0],\ldots,dX[n-2]-dX[n-3]\}$;

The maxima of the discrete image data satisfy diff(sign(diff(X)))=−2, and the minima of the discrete image data satisfy diff(sign(diff(x)))=2, wherein sign(r) is a sign function which returns a value 1 when r>0, returns a value −1 when r<0, and returns a value 0 when r=0.

7. The computing device according to claim 6, wherein the object has multiple layers.

8. The computing device according to claim 7, wherein the object is a liquid crystal display (LCD).

9. The computing device according to claim 6, the control device further to:

filter the discrete image data before computing the maxima and minima.

10. The computing device according to claim 6, wherein the number of the maxima is one less than the number of the minima.

11. A non-transitory storage medium having stored thereon instructions that, when executed by a processor of a computing device, causes the processor to perform a focus identification method, wherein the method comprises:

acquiring discrete image data from a plurality of images of an object, wherein the plurality of images are captured by a charge coupled device (CCD) of a measurement machine every a predetermined time period when the CCD moves along a Z-axis of the measurement machine at a fixed speed, and the discrete image data comprises definitions of the plurality of images and Z-coordinates of the CCD when capturing the plurality of images;

computing maxima and minima of the discrete image data;

establishing intervals of the discrete image data according to the maxima and minima;

selecting an interval from the established intervals;

fitting a curve according to the discrete image data in the selected interval, and computing a mathematical expression of the fitted curve; and computing a peak value of the fitted curve as one of focuses of the object according to the mathematical expression, and storing the mathematical expression and the peak value into a storage device of the computing device upon condition that a goodness of fit of the fitted curve meets a predetermined criterion;

computing the maxima and the minima of the discrete image data by a formula as follows:

$X=\{X[0],X[1],\ldots,X[n-1]\}$, wherein $X[0], X[1], \ldots, X[n-1]$ are the discrete image data;

The first derivative of the above forum is:

$dX=\mathrm{diff}(x)=\{X[1]-X[0],\ldots,X[n-1]-X[n-2]\}$; and

The second derivative of the above forum is:

$d_2X=\mathrm{diff}(\mathrm{diff}(x))=\{dX[1]-dX[0],\ldots,dX[n-2]-dX[n-3]\}$;

The maxima of the discrete image data satisfy diff(sign(diff(X)))=−2, and the minima of the discrete image data satisfy diff(sign(diff(x)))=2, wherein sign(r) is a sign function which returns a value 1 when r>0, returns a value −1 when r<0, and returns a value 0 when r=0.

12. The non-transitory storage medium according to claim 11, wherein the object has multiple layers.

13. The non-transitory storage medium according to claim 12, wherein the object is a liquid crystal display (LCD).

14. The non-transitory storage medium according to claim 11, wherein the number of the maxima is one less than the number of the minima.

15. The non-transitory storage medium according to claim 14, wherein the method further comprises:

filtering the discrete image data before computing the maxima and minima.

\* \* \* \* \*